(12) United States Patent
Saito

(10) Patent No.: US 7,538,955 B2
(45) Date of Patent: May 26, 2009

(54) IMAGING LENS

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/904,842

(22) Filed: Sep. 28, 2007

(65) Prior Publication Data
US 2008/0094732 A1 Apr. 24, 2008

(51) Int. Cl.
G02B 3/02 (2006.01)
(52) U.S. Cl. .................. 359/716; 359/772; 359/791
(58) Field of Classification Search ........... 359/689, 359/686, 695, 716, 784, 791, 779, 772
See application file for complete search history.

(56) References Cited

U.S. PATENT DOCUMENTS 5,739,960 A * 4/1998 Tanaka .................. 359/683
2008/0094733 A1* 4/2008 Saito ...................... 359/784

FOREIGN PATENT DOCUMENTS

| JP | 08-062498 | 3/1996 |
| JP | 2003-322792 | 11/2003 |
| JP | 2004-163786 | 6/2004 |
| JP | 2004-163850 | 6/2004 |
| JP | 2005-091513 | 4/2005 |
| JP | 2005-173298 | 6/2005 |
| JP | 2006-047944 | 2/2006 |

* cited by examiner

Primary Examiner—Timothy J Thompson
(74) Attorney, Agent, or Firm—William L. Androlia; H. Henry Koda

(57) ABSTRACT

It is to provide an imaging lens that can maintain optical performance and actualize size and weight reduction.

The imaging lens comprises, in order from an object side to an image surface side, a first lens that is a meniscus lens having a positive power whose convex surface faces the object side, a diaphragm, a second lens that is a meniscus lens having a positive power whose convex surface faces the image surface side, and a third lens that is a biconcave lens having a negative power, wherein a condition expressed by $0.11 < d_4/fl \leq 0.25$ (where, $d_4$: distance between the second lens and the third lens on the optical axis, and fl: focal distance of the entire lens system) is to be satisfied.

7 Claims, 13 Drawing Sheets

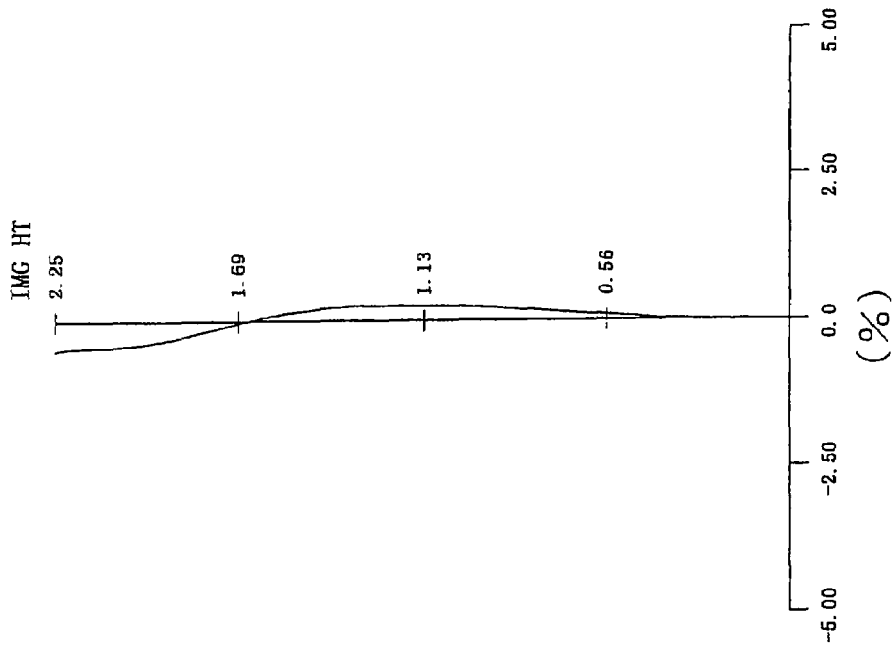
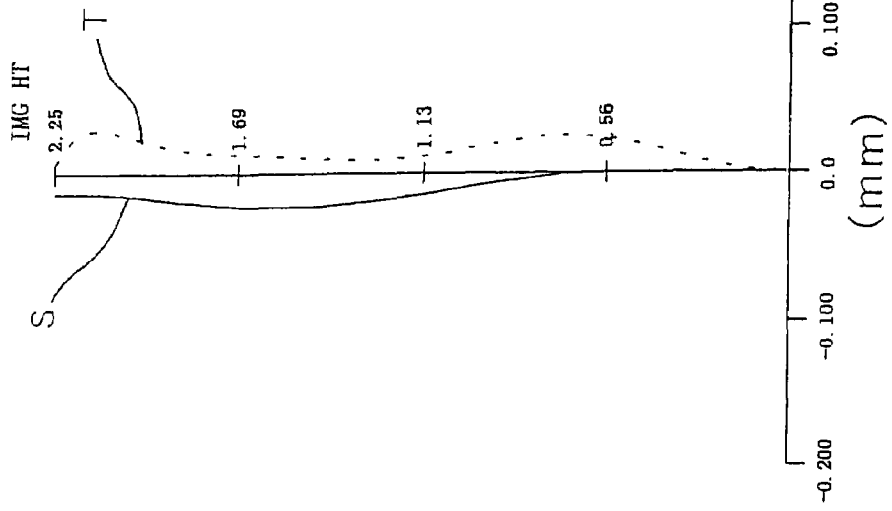
Fig.3

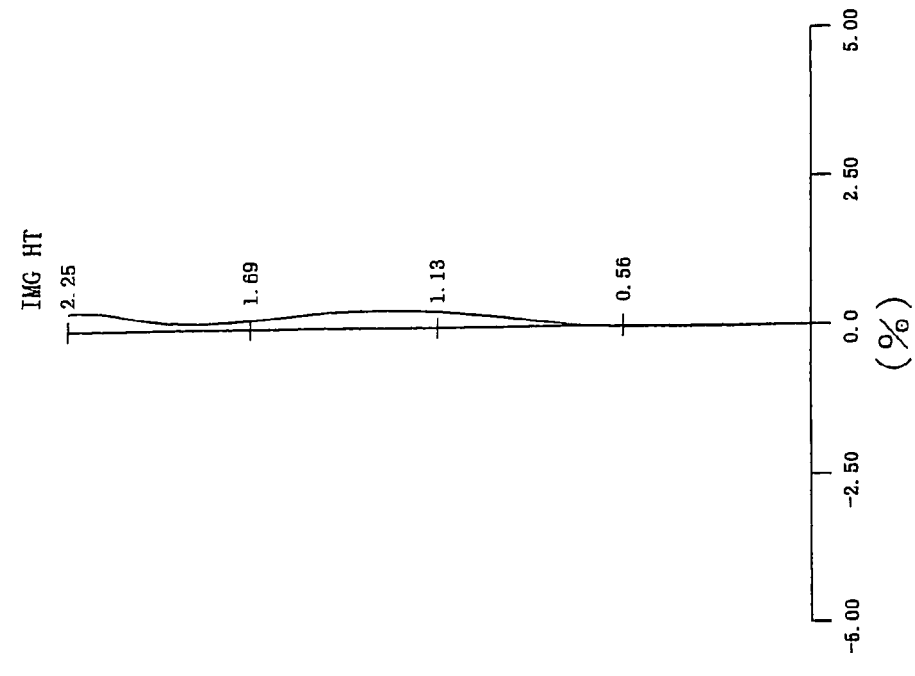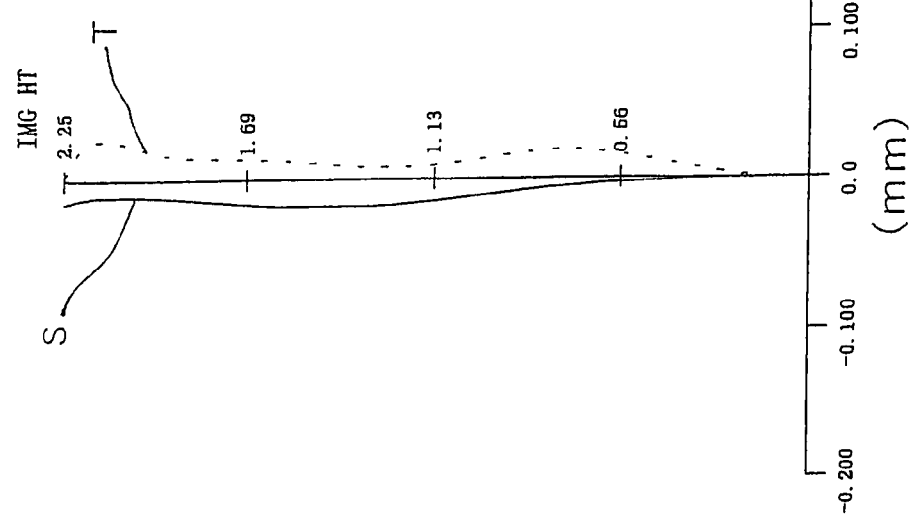
Fig.5

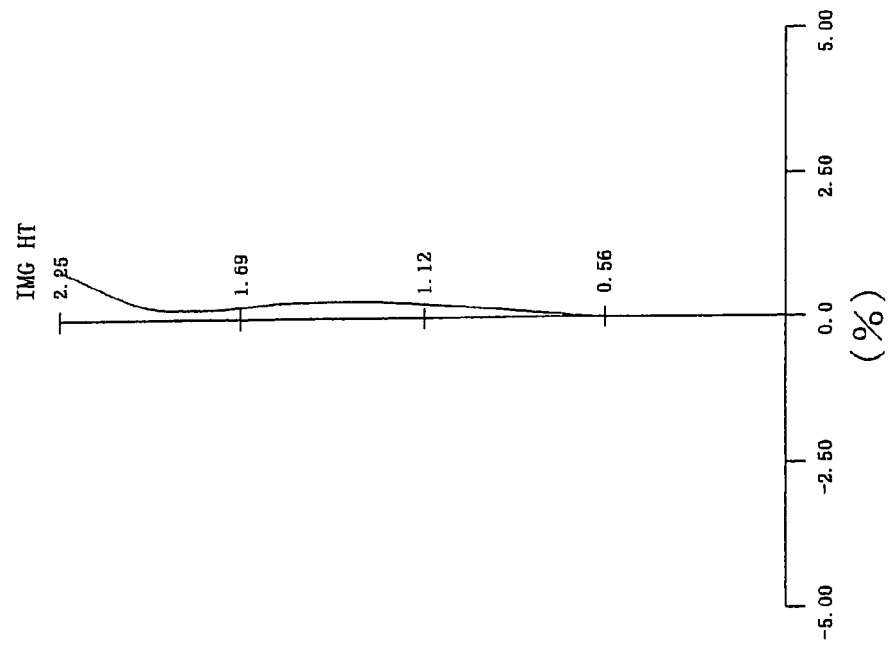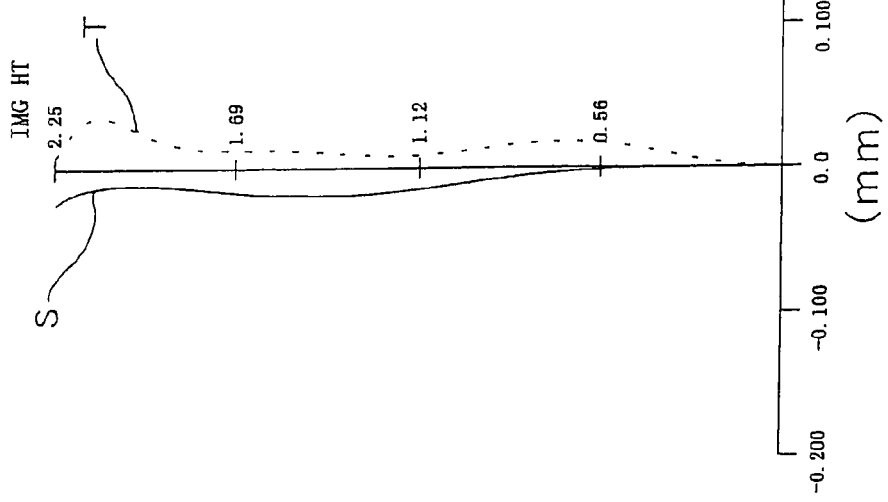
Fig.9

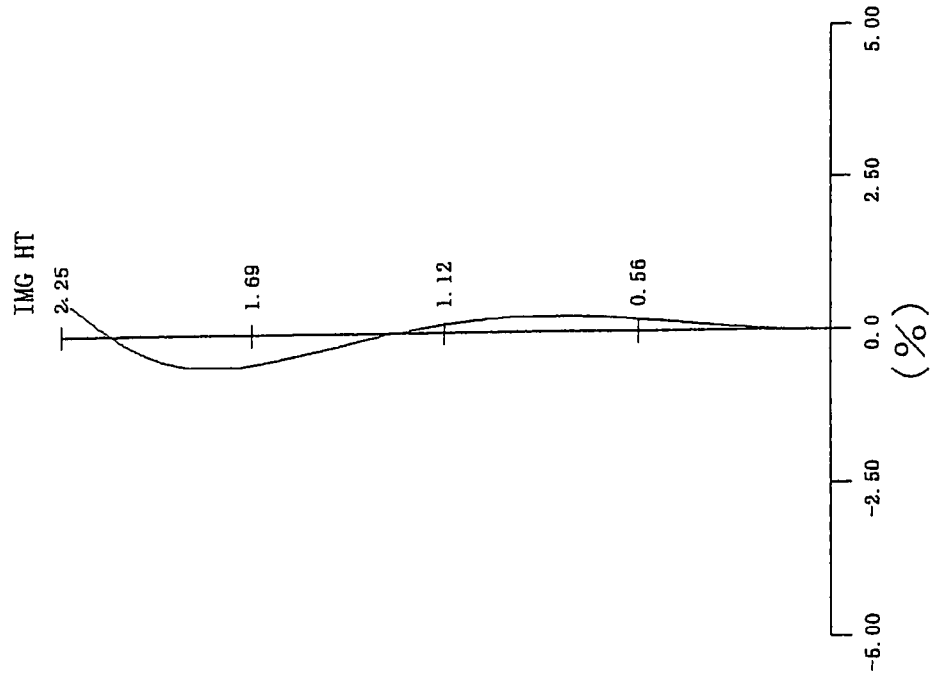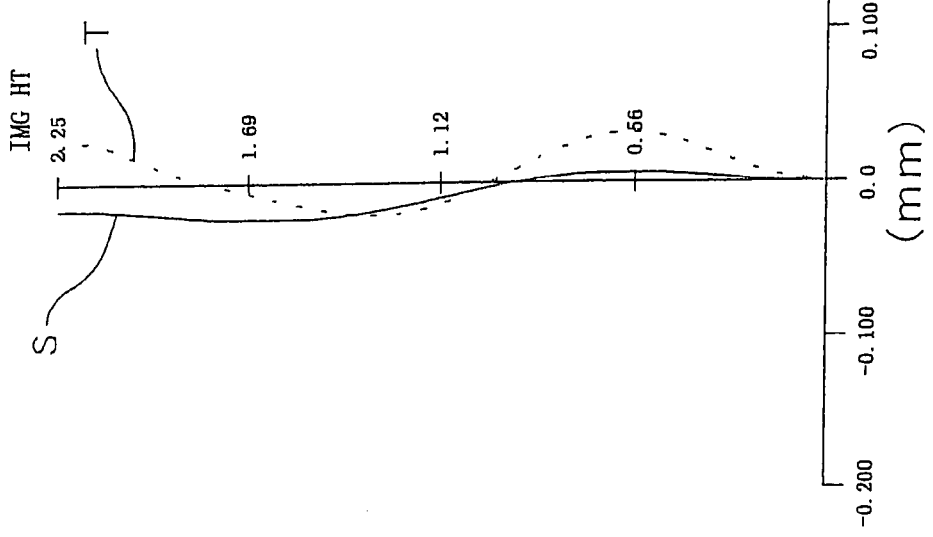
Fig.11

IMAGING LENS

BACKGROUND OF THE INVENTION

1. Field of the Invention

The present invention relates to an imaging lens. In particular, the present invention relates to an imaging lens having a three-lens structure that is capable of size and weight reduction. The imaging lens is used in an image-taking device that uses an image sensor element, such as a charge-coupled device (CCD) and a complementary metal oxide semiconductor (CMOS), mounted on a portable computer, a television phone, a portable phone, and the like.

2. Description of the Related Art

In recent years, there has been an increasing demand for cameras that utilize an image sensor element, such as the CCD, the CMOS, or the like, that is mounted on a portable computer, a television phone, a portable phone, a digital camera, and the like. It is demanded that a camera such as this is small and light because the camera is required to be mounted on a limited installation space.

Therefore, it is also necessary for the imaging lens used in such cameras to be similarly small and light. Conventionally, a single-lens structure lens system using a single lens and a two-lens structure lens system having two lenses have been used as such an imaging lens.

However, although such imaging lenses are extremely effective in reducing the size and weight of the lens system, the imaging lens cannot sufficiently handle high image quality and high resolution required of the imaging lenses in recent years.

Therefore, conventionally, a three-lens structure lens system using three lenses is used to handle high image quality and high resolution.

As examples of such a three-lens structure lens system attempting to enhance image quality and resolution, for example, the lens systems described in the following Patent Literatures 1 to 4 are known.

[Patent Literature 1] Japanese Patent Unexamined Publication 2005-173298
[Patent Literature 2] Japanese Patent Unexamined Publication 2005-91513
[Patent Literature 3] Japanese Patent Unexamined Publication 2003-322792
[Patent Literature 4] Japanese Patent Unexamined Publication 2004-163786

However, in the lens system described in Patent Literature 1, a third lens is a negative lens of which the convex surface faces the object side. Therefore, a balance between aberration correction and size reduction of the lens system is difficult to achieve. In addition, in power distribution of first to third lenses in the lens system described in Patent Literature 1 and a comparison of the center radius curvatures of both surfaces of the first lens, the back focus distance becomes too long. As a result, the overall length of the lens system becomes too long.

As in the lens system described in Patent Literature 1, in the power distribution of first to third lenses in the lens system described in Patent Literature 2, the back focus distance becomes too long. As a result, the overall length of the lens system becomes too long.

Furthermore, in the lens system described in Patent Literature 3, a third lens is a negative lens of which the convex surface faces the object side. Therefore, as in the lens system described in Patent Literature 1, a balance between aberration correction and size reduction of the lens system is difficult to achieve. In addition, in power distribution of first to third lenses in the lens system described in Patent Literature 3, the overall length of the optical system becomes too long. Moreover, in the lens system described in Patent Literature 3, the back focus distance is short and the third lens is a meniscus lens. Therefore, on an optical surface edge, a last surface is shaped to largely protrude toward an image-taking surface side, interfering with insertion of various filters.

Still further, in the power distribution of a first lens, a second lens, and a third lens in the lens system described in Patent Literature 4, the overall length of the lens system becomes too long.

Therefore, the conventional lens system was insufficient for actualizing further size reduction (such as shortening of the overall length) of the lens system itself, while maintaining excellent optical performance, such as high image quality and high resolution.

SUMMARY OF THE INVENTION

The present invention has been achieved in light of the above-described problems. An object of the invention is to provide an imaging lens that can actualize size reduction while maintaining excellent optical performance.

In order to achieve the aforementioned object, an imaging lens according to a first aspect of the present invention is an imaging lens used for forming an image of an object on an image-taking surface of an image sensor element comprising, in order from an object side to an image surface side: a first lens that is a meniscus lens having a positive power whose convex surface faces the object side, a diaphragm, a second lens that is a meniscus lens having a positive power whose convex surface faces the image surface side, and a third lens that is a biconcave lens having a negative power, wherein a condition expressed by the following expression (1) is to be satisfied:

$$0.11 \leq d_4/fl \leq 0.25 \quad (1)$$

where, $d_4$: distance between the second lens and the third lens on the optical axis fl: focal distance of the entire lens system In the first aspect of the invention, the first lens is a meniscus lens having a positive power whose convex surface faces the object side. The second lens is a meniscus lens having a positive power whose convex surface faces the image surface side. The third lens is a biconcave lens having a negative power. The diaphragm is disposed between the first lens and the second lens. In addition, the condition expressed by the expression (1) is satisfied. Therefore, size and weight can be reduced, telecentricity can be secured, excellent optical performance can be maintained, and productivity can be maintained. Moreover, as a result of the shape of the second lens, light rays from surrounding areas can be effectively used.

Productivity, herein, means not only the productivity for mass-producing imaging lenses (such as moldability, easiness of assembly, and cost when imaging lenses are mass-produced by injection molding), but also easiness of processing, manufacture, etc. of equipment used for manufacturing the imaging lenses (such as easiness of processing a mold used for injection molding).

An imaging lens according to a second aspect is the imaging lens according to the first aspect, wherein, further, a condition expressed by a following expression (2) is to be satisfied:

$$1 \leq L/fl \leq 1.3 \quad (2)$$

where,

L: overall length of lens system (distance from the surface of the first lens on the object side to the image-taking surface [equivalent air length])

In the second aspect of the present invention, further, the expression (2) is satisfied. Therefore, the imaging lens can be reduced in size and weight, while maintaining excellent optical performance and productivity.

An imaging lens according to a third aspect is the imaging lens according to the first or second aspect, wherein, further, a condition expressed by a following expression (3) is to be satisfied:

$$0.6 \leq f_1/fl \leq 0.9 \quad (3)$$

where, $f_1$: focal distance of the first lens

In the third aspect of the invention, further, the expression (3) is satisfied. Therefore, the imaging lens can be further reduced in size and weight, while suitably securing the required back focus distance, and productivity can be further improved.

An imaging lens according to a fourth aspect is the imaging lens according to any one of aspects 1 to 3, wherein, further, a condition expressed by a following expression (4) is to be satisfied:

$$0 < f_1/f_2 \leq 0.8 \quad (4)$$

where, $f_2$: focal distance of the second lens

In the fourth aspect of the present invention, further, the expression (4) is satisfied. Therefore, the size and weight of the imaging lens can be further reduced, while maintaining excellent optical performance with further certainty.

An imaging lens according to a fifth aspect is the imaging lens according to any one of aspects 1 to 4, wherein, further, a condition expressed by a following expression (5) is to be satisfied:

$$-1 \leq f_1/f_3 \leq -0.1 \quad (5)$$

where, $f_3$: focal distance of the third lens

In the fifth aspect of the present invention, further, the expression (5) is satisfied. Therefore, the size and weight can be further reduced, while maintaining excellent optical performance with further certainty.

An imaging lens according to a sixth aspect is the imaging lens according to any one of aspects 1 to 5, wherein, further, a condition expressed by a following expression (6) is to be satisfied:

$$0.12 \leq d_2/fl \leq 0.2 \quad (6)$$

where, $d_2$: distance between the first lens and the second lens on the optical axis In the sixth aspect of the present invention, further, the expression (6) is satisfied. Therefore, the imaging lens can be more effectively reduced in size and weight, while more effectively securing the required back focus distance, and productivity can be further improved.

An imaging lens according to a seventh aspect is the imaging lens according to any one of aspects 1 to 6, wherein, further, a condition expressed by a following expression (7) is to be satisfied:

$$0.01 \leq d_3/fl \leq 0.2 \quad (7)$$

where, $d_3$: center thickness of the second lens

In the seventh aspect of the present invention, further, the expression (7) is satisfied. Therefore, the imaging lens can be more effectively reduced in size and weight, and the productivity can be further improved.

[Effect of the Invention]

In the imaging lens of the invention, size and weight reduction can be actualized while maintaining excellent optical performance.

In particular, a high-performance imaging lens that is compact and has a short optical length can be actualized.

BRIEF DESCRIPTION OF THE DRAWINGS

FIG. 3 shows graphs for describing the astigmatism and distortion of the imaging lens shown in FIG. 2;

FIG. 5 shows graphs for describing the astigmatism and distortion of the imaging lens shown in FIG. 4;

FIG. 9 shows graphs for describing the astigmatism and distortion of the imaging lens shown in FIG. 8;

FIG. 11 shows graphs for describing the astigmatism and distortion of the imaging lens shown in FIG. 10;

DETAILED DESCRIPTION OF THE PREFERRED EMBODIMENT

An embodiment of the imaging lens according to the present invention will be described hereinafter with reference to FIG. 1.

Figure 1:
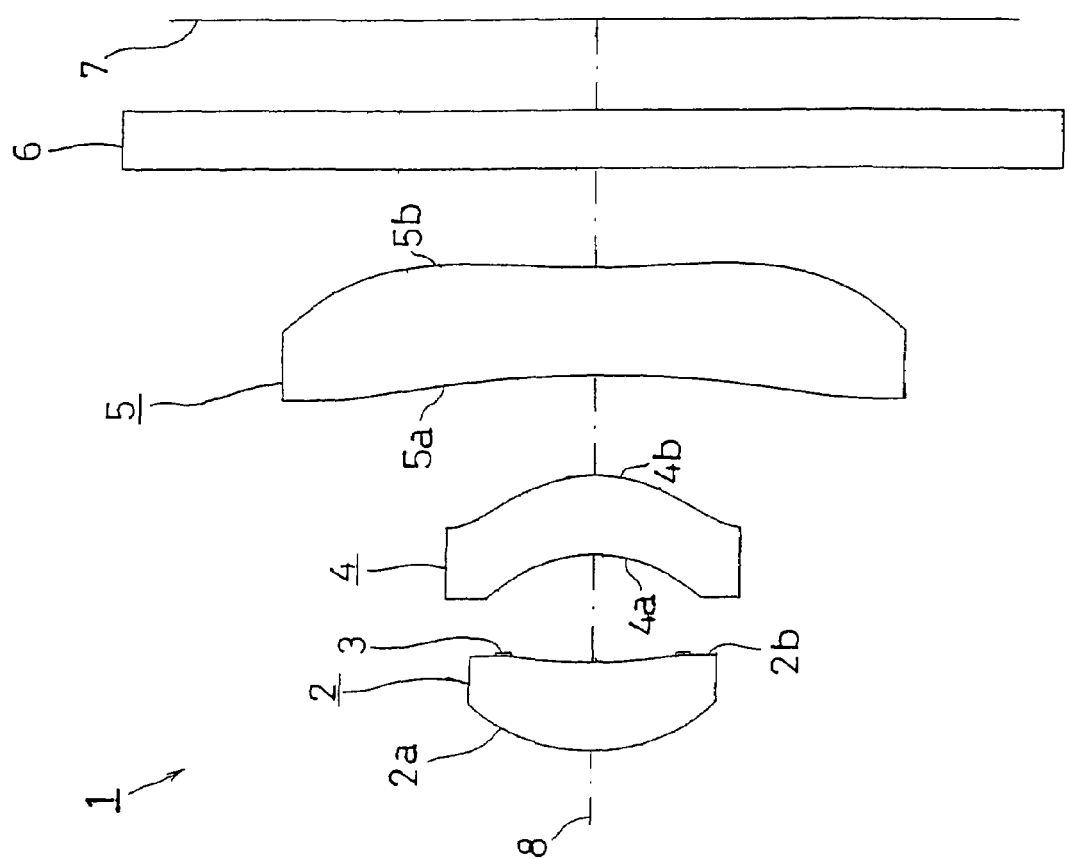
FIG. 1 is a schematic diagram for showing an embodiment of an imaging lens according to the present invention.

As shown in FIG. 1, an imaging lens 1 according to the embodiment comprises, in order from the object side toward the image surface side, a resin-type first lens 2 that is a meniscus lens having a positive power whose convex surface faces the object side, a diaphragm 3, a resin-type second lens 4 that is a meniscus lens having a positive power whose convex surface faces the image surface side, and a resin-type third lens 5 that is a biconcave lens having a negative power. Each lens 2, lens 4, and lens 5 are formed from resin material, such as cyclo-olefin copolymers, cycle-olefin polymers, and polycarbonate, using an injection-molding method.

Hereafter, respective lens surfaces 2a, 4a, and 5a on the object side of the first lens 2, the second lens 4, and the third lens 5 are referred to as first face 2a, first face 4a, and first face 5a of each lens 2, lens 4, and lens 5. Respective lens surfaces 2b, 4b, and 5b on the image surface side of the first lens 2, the second lens 4, and the third lens 5 are referred to as first face 2a, first face 4a, and first face 5a of each lens 2, lens 4, and lens 5.

On the second face 5b of the third lens 5, there are respectively disposed various filters 6, such as a cover glass, an infrared (IR) cut filter, and a lowpass filter, and an image-taking surface 7 that is a light-receiving surface of an image sensor element, such as a CCD or a CMOS. The various filters 6 may be omitted as required.

According to the embodiment, the first lens satisfies a condition expressed by the following expression (1):

$$0.11 \leq d_4/fl \leq 0.25 \quad (1)$$

where, $d_4$ in the expression (1) is the distance between the second lens 4 and the third lens 5 on an optical axis 8 (the same applies hereafter). fl in the expression (1) is the focal distance of the entire lens system (the same applies hereafter).

When the shape of each lens 2, lens 4, and lens 5 is not the shape described according to the embodiment, it becomes difficult to maintain telecentricity and optical performance, while keeping the overall length of the optical system short.

When the value of $d_4/fl$ is greater than the value (0.25) in the expression (1), the height of the light ray passing through the second face 5b of the third lens 5 becomes too high. Therefore, the third lens 5 increases in size and weight, and production becomes difficult. Furthermore, the required back focus distance becomes difficult to secure.

At the same time, when the value of $d_4/fl$ is equal to or less than the value (0.11) in the expression (1), the back focus distance becomes too long. Therefore, the size reduction of the entire optical system becomes difficult. It also becomes difficult to insert the diaphragm that effectively limits the amount of light.

According to the embodiment, the first lens 2 is a meniscus lens having a positive power whose convex surface faces the object side. The second lens 4 is a meniscus lens having a positive power whose convex surface faces the image surface side. The third lens 5 that is a biconcave lens having a negative power. The diaphragm 3 is disposed between the first lens 2 and the second lens 4. In addition, the value of $d_4/fl$ is set to satisfy the condition expressed by the expression (1). Therefore, the size and weight can be reduced, the telecentricity can be secured, excellent optical performance can be maintained, and the productivity can be maintained. Moreover, as a result of the shape of the second lens 4, light rays from surrounding areas can be effectively used.

The relationship between $d_4$ and fl is more preferably $0.011 < d_4/fl \leq 0.2$.

In addition to the above-described configuration, according to the embodiment, a condition expressed by a following expression (2) is satisfied:

$$1 \leq L/fl \leq 1.3 \quad (2)$$

where, L in the expression (2) is the overall length of lens system, or in other words, the distance from the first face 2a of the first lens 2 to the image-taking surface 7 (equivalent air length) (the same applies hereafter).

When the value of L/fl is greater than the value (1.3) in the expression (2), the entire optical system becomes too large.

At the same time, when the value of L/fl is less than the value (1) in the expression (2), the entire optical system becomes too small. Therefore, the productivity declines, and the optical performance becomes difficult to maintain.

Therefore, according to the embodiment, by the value of L/fl being set to satisfy the expression (2), the imaging lens can be further reduced in size and weight, while maintaining excellent optical performance and productivity with further certainty.

The relationship between L and fl is more preferably $1.15 \leq L/fl \leq 1.3$.

In addition to the above-described configuration, according to the embodiment, a condition expressed by a following expression (3) is satisfied:

$$0.6 \leq f_1/fl \leq 0.9 \quad (3)$$

where, $f_1$ in the expression (3) is the focal distance of the first lens 2 (the same applies hereafter).

When the value of $f_1/fl$ is greater than the value (0.9) in the expression (3), the back focus distance becomes too long. Therefore, the size reduction of the optical system becomes difficult.

At the same time, when the value of $f_1/fl$ is less than the value (0.6) in the expression (3), the power of the first lens 2 becomes too strong. Therefore, the productivity declines. The required back focus distance also becomes difficult to secure.

Therefore, according to the embodiment, by the value of $f_1/fl$ being set to satisfy the expression (3), the imaging lens 1 can be more effectively reduced in size and weight and productivity can be further improved, while securing the required back focus distance.

The relationship between $f_1$ and fl is more preferably $0.65 \leq f_1/fl \leq 0.85$.

In addition to the above-described configuration, according to the embodiment, a condition expressed by a following expression (4) is satisfied:

$$0 < f_1/f_2 \leq 0.8 \quad (4)$$

where, $f_2$ in the expression (4) is the focal distance of the second lens 4 (the same applies hereafter).

When the value of $f_1/f_2$ is greater than the value (0.8) in the expression (4), the power of the first lens 2 becomes relatively too weak. Therefore, the size reduction of the optical system becomes difficult. The power balance between the first lens 2 and the second lens 4 cannot be achieved, and the optical performance deteriorates.

At the same time, when the value of $f_1/f_2$ is near the value (0) in the expression (4), the power of the first lens 2 becomes relatively too strong. Therefore, the productivity declines. Either the first lens 2 or the second lens 4 has a negative power, and the desired optical performance cannot be achieved. Furthermore, the power balance between the first lens 2 and the second lens 4 becomes poor, and the optical performance deteriorates.

Therefore, according to the embodiment, by the value of $f_1/f_2$ being set to satisfy the expression (4), the size and weight of the imaging lens can be further reduced, while maintaining excellent optical performance with further certainty.

The relationship between $f_1$ and $f_2$ is more preferably $0.12 < f_1/f_2 \leq 0.55$.

In addition to the above-described configuration, according to the embodiment, a condition expressed by a following expression (5) is satisfied:

$$-1 \leq f_1/f_3 \leq -0.1 \quad (5)$$

where, $f_3$ in the expression (5) is the focal distance of the third lens 5 (the same applies hereafter).

When the value of $f_1/f_3$ is greater than the value (−0.1) in the expression (5), the power of the first lens 2 becomes too strong. Therefore, productivity declines. The power balance between the first lens 2 and the third lens 5 cannot be achieved, and the optical performance cannot be maintained.

At the same time, when the value of $f_1/f_3$ is less than the value (−1) in the expression (5), the power of the third lens 5 becomes relatively too strong. Therefore, the size reduction of the optical system becomes difficult. The power balance between the first lens 2 and the third lens 5 becomes poor, and the optical performance deteriorates.

Therefore, according to the embodiment, by the value of $f_1/f_3$ being set to satisfy the expression (5), the size and weight can be further reduced, while maintaining excellent optical performance with further certainty.

The relationship between $f_1$ and $f_3$ is more preferably $-0.85 \leq f_1/f_3 \leq -0.25$.

In addition to the above-described configuration, according to the embodiment, a condition expressed by a following expression (6) is satisfied:

$$0.12 \leq d_2/fl \leq 0.2 \quad (6)$$

where, $d_2$ in the expression (6) is the distance between the first lens 2 and the second lens 4 on the optical axis 8.

When the value of $d_2/fl$ is greater than the value (0.2) in the expression (6), the required back focus distance becomes difficult to secure. The height of the light ray passing through the second face 5b of the third lens 5 becomes too high. Therefore, the third lens 5 increases in size and weight, and production becomes difficult.

At the same time, when the value of $d_2/fl$ is less than the value (0.12) in the expression (6), the back focus distance becomes too long. Therefore, the size reduction of the entire optical system becomes difficult. In addition, it becomes difficult to insert the diaphragm that effectively limits the amount of light.

Therefore, according to the embodiment, by the value of the $d_2/fl$ being set to satisfy the expression (6), the imaging lens 1 can be more effectively reduced in size and weight, while more effectively securing the required back focus distance, and productivity can be further improved.

The relationship between $d_2$ and fl is more preferably $0.14 \leq d_2/fl \leq 0.185$.

In addition to the above-described configuration, according to the embodiment, a condition expressed by a following expression (7) is satisfied:

$$0.01 \leq d_3/fl \leq 0.2 \quad (7)$$

where, $d_3$ in the expression (7) is the center thickness of the second lens (the same applies hereafter).

When the value of $d_3/fl$ is greater than the value (0.2) in the expression (7), the back focus distance becomes too long. Therefore, the size reduction of the entire optical system becomes difficult. The height of the light ray passing through the second face 5b of the third lens 5 becomes too high. Therefore, the third lens 5 increases in size and weight, and production becomes difficult.

At the same time, when the value of $d_3/fl$ is less than the value (0.01) in the expression (7), the production of the second lens 4 becomes difficult.

Therefore, according to the embodiment, by the value of the $d_3/fl$ being set to satisfy the expression (7), the imaging lens 1 can be more effectively reduced in size and weight, and the productivity can be further improved.

The relationship between $d_3$ and fl is more preferably $0.1 \leq d_3/fl \leq 0.145$.

EXAMPLES

Next, EXAMPLES of the present invention will be described with reference to FIG. 2 to FIG. 13.

In the EXAMPLES, F no denotes F number, ω denotes half of the angle-of-view, and r denotes the center radius curvature. Further, d denotes a distance to the next optical surface, nd denotes the index of refraction of the d line, and vd denotes the Abbe number (based on d line).

k, A, B, C, and D denote each coefficient in a following expression (8). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, and D are the aspherical coefficients, and r is the center radius curvature.

$$Z(X) = r^{-1}X^2/[1+\{1-(k+1)r^{-2}X^2\}^{1/2}] + AX^4 + BX^6 + CX^8 + DX^{10} \quad (8)$$

In the following EXAMPLES, reference code E used for a numerical value denoting the constant of cone and the aspherical coefficient indicates that the numerical value following E is an exponent having 10 as the base and that the numerical value before E indicates is multiplied by the numerical value denoted by the exponent having 10 as the base. For example, −8.0E−1 denotes $-8.0 \times 10^{-1}$.

First Example

Figure 2:
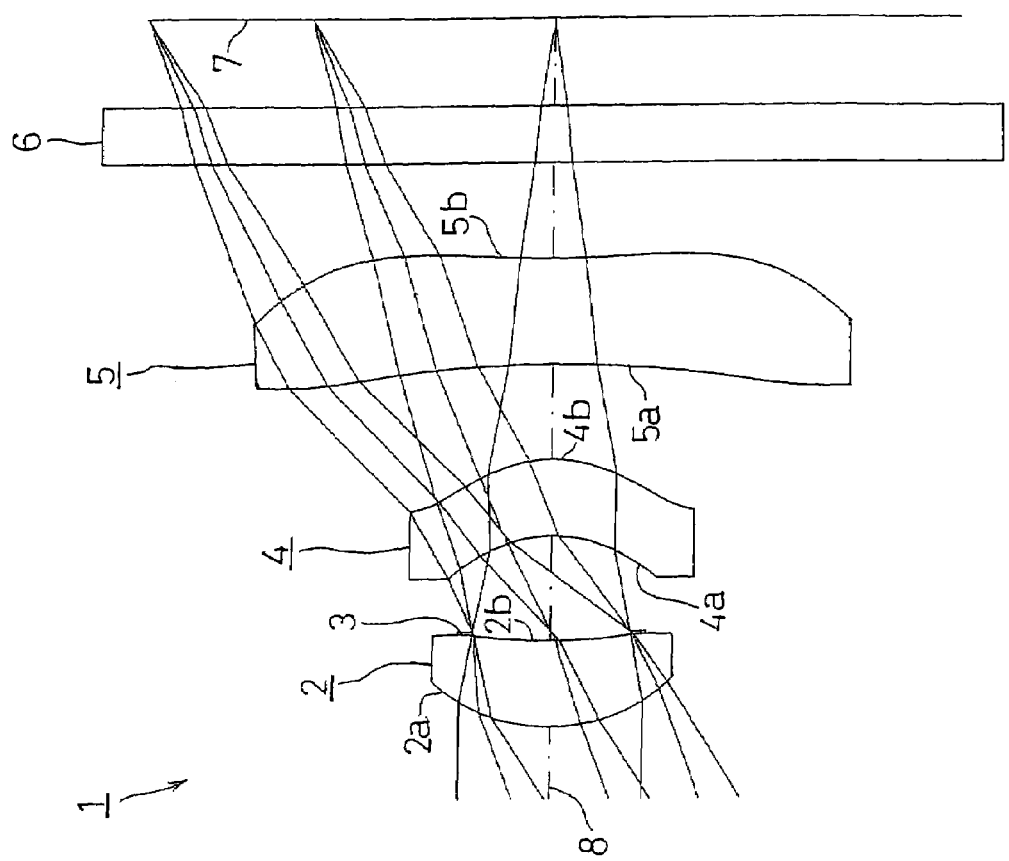
FIG. 2 is a schematic diagram for showing a FIRST EXAMPLE of the imaging lens according to the present invention.

FIG. 2 shows a FIRST EXAMPLE of the present invention. The imaging lens 1 according to the FIRST EXAMPLE shown in FIG. 2 is the same imaging lens 1 as that shown in FIG. 1.

The imaging lens 1 of the FIRST EXAMPLE was set under the following conditions:

Lens Data

F no=3.25, ω=34.58°, L=3.61 mm, fl=3.25 mm, $f_1$=2.75 mm, $f_2$=8.061 mm $f_3$=−5.456 mm

| Face Number | r | d | nd | vd |
|---|---|---|---|---|
| (Object Point) | | | | |
| 1 (First Face of First Lens) | 0.96 | 0.45 | 1.5310 | 56.0 |
| 2 (Second Face of First Lens) | 0.33 | 0.05 | | |
| 3 (Diaphragm) | 0.00 | 0.50 | | |
| 4 (First Face of Second Lens) | −1.25 | 0.40 | 1.5310 | 56.0 |
| 5 (Second Face of Second Lens) | −1.26 | 0.50 | | |
| 6 (First Face of Third Lens) | −0.12 | 0.55 | 1.5310 | 56.0 |
| 7 (Second Face of Third Lens) | 0.21 | 0.50 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −8.0E−1 | 1.0E−1 | 2.3E−1 | −3.1E−1 | 6.0E−1 |
| 2 | 0 | 5.8E−2 | −3.0E−3 | 1.0E−1 | 0 |
| 4 | 4.8E−1 | 1.3E−1 | 6.6E−1 | 1.8 | 0 |
| 5 | −3.6E−1 | 2.9E−1 | −2.0E−1 | 1.9 | −1.2 |

-continued

| Face Number | k | A | B | C | D |
|---|---|---|---|---|---|
| 6 | 0 | −7.9E−3 | −6.6E−3 | 9.8E−3 | −1.9E−3 |
| 7 | −8.7E+1 | −7.5E−2 | 1.5E−2 | −6.7E−3 | 1.1E−3 |

Under such conditions, $d_4/fl=0.154$ was achieved, thereby satisfying the expression (1). $L/fl=1.11$ was achieved, thereby satisfying the expression (2). $f_1/fl=0.846$ was achieved, thereby satisfying the expression (3). $f_1/f_2=0.341$ was achieved, thereby satisfying the expression (4). $f_1/f_3=-0.504$ was achieved, thereby satisfying the expression (5). $d_2/fl=0.169$ was achieved, thereby satisfying the expression (6). $d_3/fl=0.123$ was achieved, thereby satisfying the expression (7).

FIG. 3 shows the astigmatism and the distortion in the imaging lens 1 of the FIRST EXAMPLE.

According to the result, each of the astigmatism and the distortion was satisfied. It can be seen from the result that a sufficiently excellent optical property can be obtained.

Second Example

Figure 4:
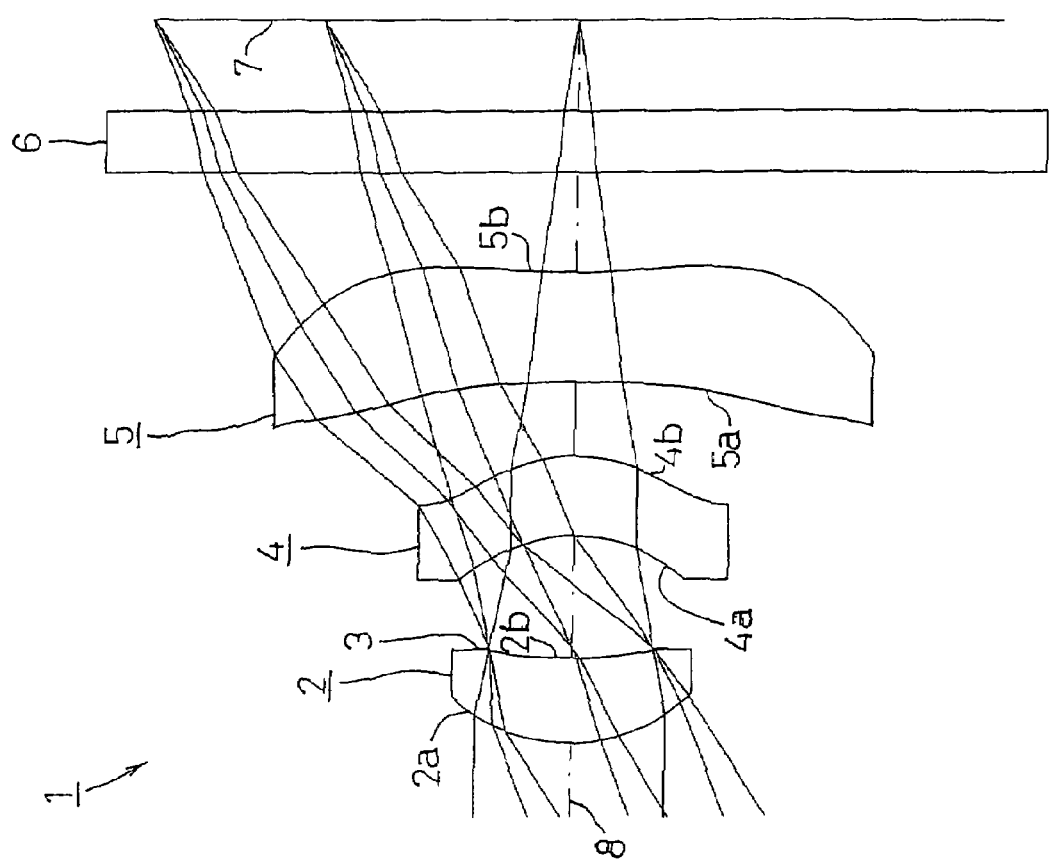
FIG. 4 is a schematic diagram for showing a SECOND EXAMPLE of the imaging lens according to the present invention.

FIG. 4 shows a SECOND EXAMPLE of the present invention. The imaging lens 1 of the SECOND EXAMPLE was set under the following conditions:

Lens Data

F no=3.25, ω=34.35°, L=3.61 mm, fl=3.25 mm, $f_1$=2.686 mm, $f_2$=7.535 mm, $f_3$=−4.459 mm

| Face Number | r | d | nd | νd |
|---|---|---|---|---|
| (Object Point) | | | | |
| 1 (First Face of First Lens) | 1.00 | 0.42 | 1.5310 | 56.0 |
| 2 (Second Face of First Lens) | 0.35 | 0.05 | | |
| 3 (Diaphragm) | 0.00 | 0.55 | | |
| 4 (First Face of Second Lens) | −1.15 | 0.40 | 1.5310 | 56.0 |
| 5 (Second Face of Second Lens) | −1.20 | 0.37 | | |
| 6 (First Face of Third Lens) | −0.09 | 0.55 | 1.5310 | 56.0 |
| 7 (Second Face of Third Lens) | 0.31 | 0.50 | | |
| 8 (First Face of Cover Glass) | 0.00 | 0.30 | 1.5168 | 64.2 |
| 9 (Second Face of Cover Glass) | 0.00 | | | |
| (Image Surface) | | | | |

| Face Number | k | A | B | C | D |
|---|---|---|---|---|---|
| 1 | −6.9E−1 | 9.1E−2 | 4.3E−1 | −1.0 | 1.8 |
| 2 | 0 | 1.0E−1 | −1.5E−2 | 6.2E−1 | 0 |
| 4 | 6.9E−1 | 1.6E−1 | 4.3E−1 | 1.6 | 0 |
| 5 | −3.8E−1 | 3.0E−1 | −3.4E−1 | 2.0 | −1.4 |
| 6 | 0 | −1.0E−1 | 4.0E−2 | 1.0E−2 | −4.8E−3 |
| 7 | −5.5E+1 | −1.0E−1 | 2.2E−2 | −7.5E−3 | 6.9E−4 |

Under such conditions, $d_4/fl=0.114$ was achieved, thereby satisfying the expression (1). $L/fl=1.11$ was achieved, thereby satisfying the expression (2). $f_1/fl=0.826$ was achieved, thereby satisfying the expression (3). $f_1/f_2=0.3565$ was achieved, thereby satisfying the expression (4). $f_1/f_3=-0.6024$ was achieved, thereby satisfying the expression (5). $d_2/fl=0.186$ was achieved, thereby satisfying the expression (6). $d_3/fl=0.123$ was achieved, thereby satisfying the expression (7).

FIG. 5 shows the astigmatism and the distortion in the imaging lens 1 of the SECOND EXAMPLE.

According to the result, each of the astigmatism and the distortion was satisfied. It can be seen from the result that a sufficiently excellent optical property can be obtained.

Third Example

Figure 6:
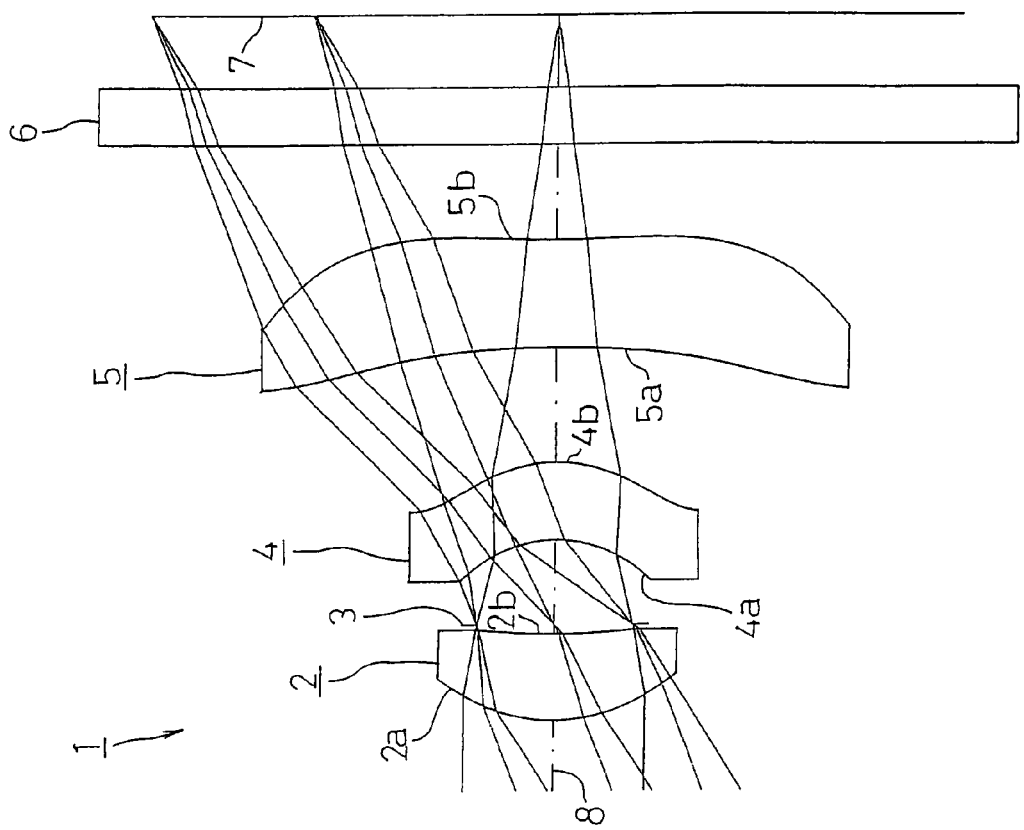
FIG. 6 is a schematic diagram for showing a THIRD EXAMPLE of the imaging lens according to the present invention.

FIG. 6 shows a THIRD EXAMPLE of the present invention. The imaging lens 1 of the THIRD EXAMPLE was set under the following conditions:

Lens Data

F no=3.25, ω=34.21°, L=3.55 mm, fl=3.251 mm, $f_1$=2.537 mm, $f_2$=14.438 mm, $f_3$=−7.113 mm

| Face Number | r | d | nd | νd |
|---|---|---|---|---|
| (Object Point) | | | | |
| 1 (First Face of First Lens) | 1.03 | 0.44 | 1.5310 | 56.0 |
| 2 (Second Face of First Lens) | 0.35 | 0.05 | | |
| 3 (Diaphragm) | 0.00 | 0.48 | | |
| 4 (First Face of Second Lens) | −1.32 | 0.40 | 1.5850 | 30.0 |
| 5 (Second Face of Second Lens) | −1.20 | 0.49 | | |
| 6 (First Face of Third Lens) | −0.12 | 0.43 | 1.5310 | 56.0 |
| 7 (Second Face of Third Lens) | 0.13 | 0.50 | | |
| 8 (First Face of Cover Glass) | 0.00 | 0.30 | 1.5168 | 64.2 |
| 9 (Second Face of Cover Glass) | 0.00 | | | |
| (Image Surface) | | | | |

| Face Number | k | A | B | C | D |
|---|---|---|---|---|---|
| 1 | −4.6E−1 | 7.5E−2 | 3.0E−1 | −4.6E−1 | 8.5E−1 |
| 2 | 0 | 6.2E−2 | 6.7E−2 | −1.5E−1 | 0 |
| 4 | 4.3E−1 | 2.3E−1 | 5.9E−1 | 1.8 | 0 |
| 5 | −5.5E−1 | 2.6E−1 | −1.3E−1 | 1.4 | −1.0 |
| 6 | 0 | 7.8E−3 | −3.8E−2 | 2.3E−2 | −3.8E−3 |
| 7 | −3.5E+2 | −8.8E−2 | 1.3E−2 | −7.8E−3 | 9.0E−4 |

Under such conditions, $d_4/fl=0.151$ was achieved, thereby satisfying the expression (1). $L/fl=1.09$ was achieved, thereby satisfying the expression (2). $f_1/fl=0.780$ was achieved, thereby satisfying the expression (3). $f_1/f_2=0.176$ was achieved, thereby satisfying the expression (4). $f_1/f_3=-0.357$ was achieved, thereby satisfying the expression (5). $d_2/fl=0.166$ was achieved, thereby satisfying the expression (6). $d_3/fl=0.124$ was achieved, thereby satisfying the expression (7).

Figure 7:
FIG. 7 shows graphs for describing the astigmatism and distortion of the imaging lens shown in FIG. 6.

FIG. 7 shows the astigmatism and the distortion in the imaging lens 1 of the THIRD EXAMPLE.

According to the result, each of the astigmatism and the distortion was satisfied. It can be seen from the result that a sufficiently excellent optical property can be obtained.

Fourth Example

Figure 8:
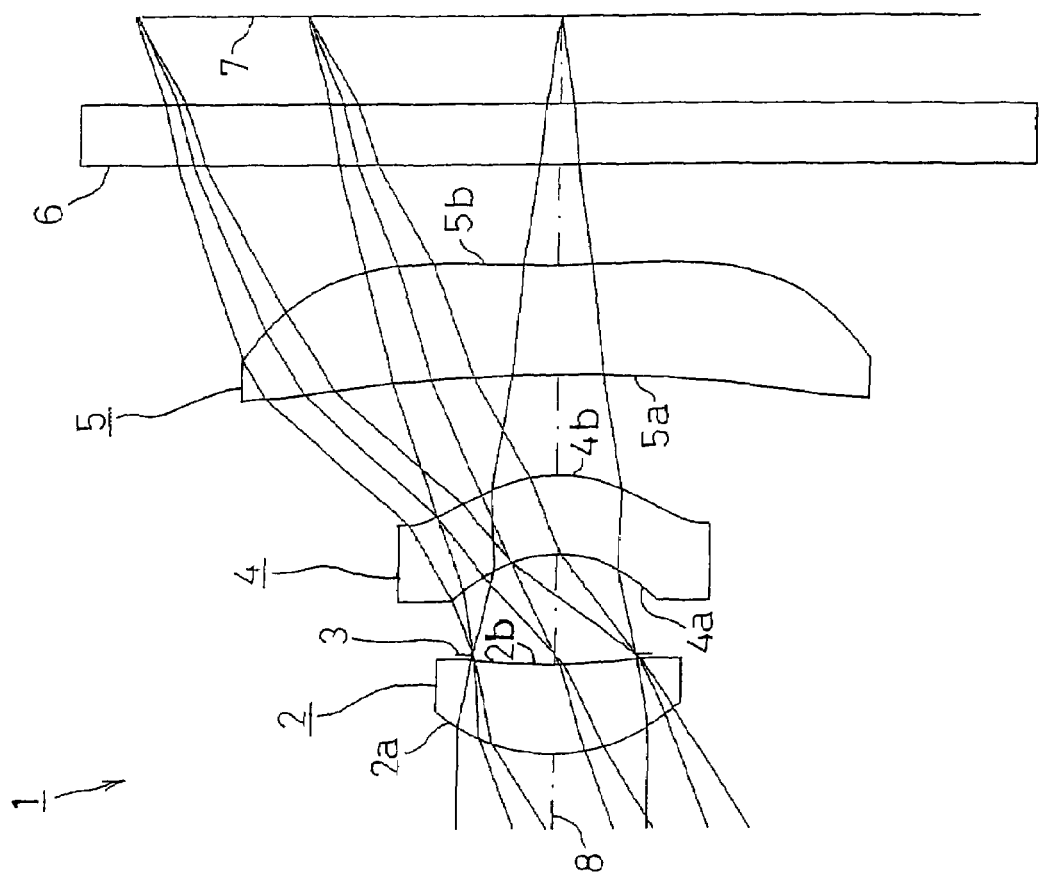
FIG. 8 is a schematic diagram for showing a FOURTH EXAMPLE of the imaging lens according to the present invention.

FIG. 8 shows a FOURTH EXAMPLE of the present invention. The imaging lens 1 of the FOURTH EXAMPLE was set under the following conditions:

Lens Data

F no=3.25, ω=34.25°, L=3.6 mm, fl=3.24 mm, $f_1$=2.465 mm, $f_2$=18.831 mm, $f_3$=−7.149 mm

| Face Number | r | d | nd | vd |
|---|---|---|---|---|
| (Object Point) | | | | |
| 1 (First Face of First Lens) | 0.99 | 0.45 | 1.5310 | 56.0 |
| 2 (Second Face of First Lens) | 0.27 | 0.05 | | |
| 3 (Diaphragm) | 0.00 | 0.50 | | |
| 4 (First Face of Second Lens) | −1.43 | 0.40 | 1.5850 | 30.0 |
| 5 (Second Face of Second Lens) | −1.25 | 0.50 | | |
| 6 (First Face of Third Lens) | −0.10 | 0.55 | 1.5310 | 56.0 |
| 7 (Second Face of Third Lens) | 0.15 | 0.50 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −5.4E−1 | 7.0E−2 | 9.9E−2 | 1.1E−1 | −5.9E−1 |
| 2 | 0 | 5.8E−3 | −2.0E−1 | −2.6E−1 | 0 |
| 4 | 2.6E−1 | 2.2E−1 | 8.8E−1 | 1.8 | 0 |
| 5 | −4.7E−1 | 2.9E−1 | −1.0E−1 | 1.6 | −1.2 |
| 6 | 0 | 2.2E−2 | −3.5E−2 | 1.8E−2 | −2.8E−3 |
| 7 | −2.1E+2 | −7.6E−2 | 1.4E−2 | −8.3E−3 | 1.2E−3 |

Under such conditions, $d_4/fl=0.154$ was achieved, thereby satisfying the expression (1). $L/fl=1.11$ was achieved, thereby satisfying the expression (2). $f_1/fl=0.761$ was achieved, thereby satisfying the expression (3). $f_1/f_2=0.131$ was achieved, thereby satisfying the expression (4). $f_1/f_3=-0.345$ was achieved, thereby satisfying the expression (5). $d_2/fl=0.170$ was achieved, thereby satisfying the expression (6). $d_3/fl=0.123$ was achieved, thereby satisfying the expression (7).

FIG. 9 shows the astigmatism and the distortion in the imaging lens 1 of the FOURTH EXAMPLE.

According to the result, each of the astigmatism and the distortion was satisfied. It can be seen from the result that a sufficiently excellent optical property can be obtained.

Fifth Example

Figure 10:
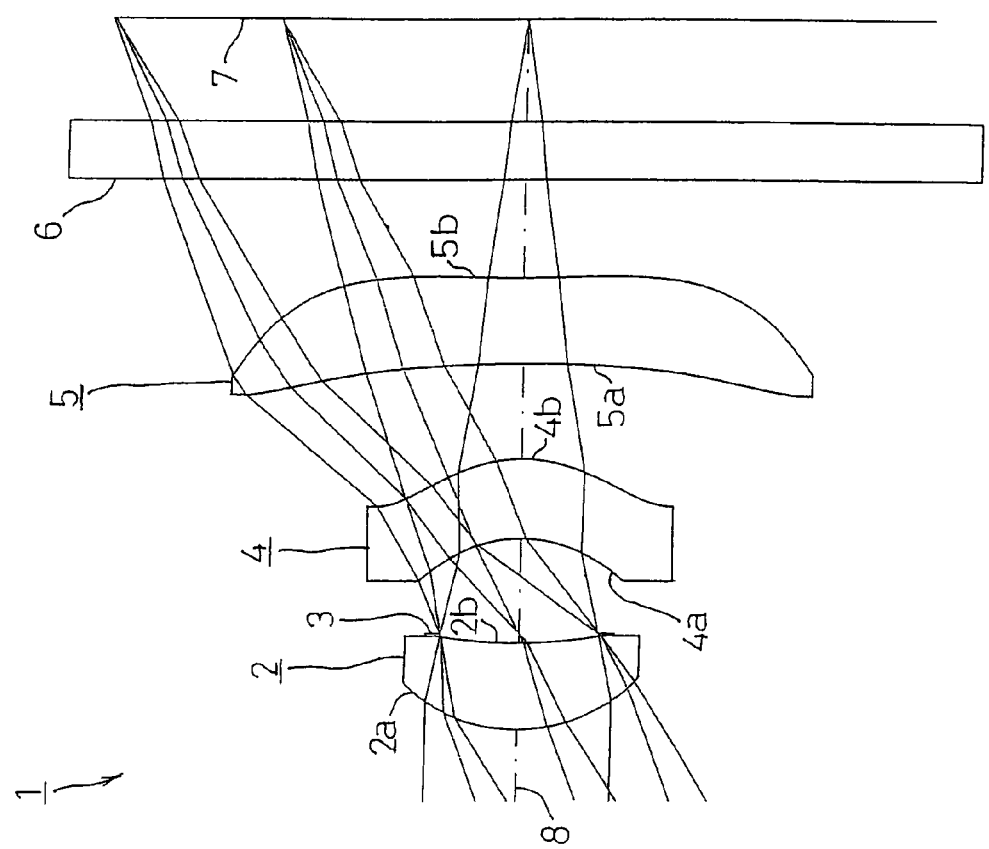
FIG. 10 is a schematic diagram for showing a FIFTH EXAMPLE of the imaging lens according to the present invention.

FIG. 10 shows a FIFTH EXAMPLE of the present invention. The imaging lens 1 of the FIFTH EXAMPLE was set under the following conditions:

Lens Data

F no=3.25, ω=34.53°, L=3.56 mm, fl=3.22 mm, $f_1$=2.457 mm, $f_2$=15.469 mm, $f_3$=−6.162 mm

| Face Number | r | d | nd | vd |
|---|---|---|---|---|
| (Object Point) | | | | |
| 1 (First Face of First Lens) | 0.97 | 0.45 | 1.5310 | 56.0 |
| 2 (Second Face of First Lens) | 0.25 | 0.05 | | |
| 3 (Diaphragm) | 0.00 | 0.45 | | |
| 4 (First Face of Second Lens) | −1.40 | 0.40 | 1.5850 | 30.0 |
| 5 (Second Face of Second Lens) | −1.25 | 0.60 | | |
| 6 (First Face of Third Lens) | −0.15 | 0.55 | 1.5310 | 56.0 |
| 7 (Second Face of Third Lens) | 0.15 | 0.50 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −8.1E−1 | 1.1E−1 | −1.0E−1 | 7.5E−1 | −1.6 |
| 2 | −2.6 | −4.1E−2 | −6.6E−2 | −1.7 | 2.6 |
| 4 | 3.9E−1 | 2.0E−1 | −4.6E−2 | 6.8 | −6.8 |
| 5 | −4.4E−1 | 2.7E−1 | −5.2E−1 | 2.9 | −2.2 |
| 6 | 6.1 | −3.2E−2 | 6.5E−3 | 6.7E−3 | −1.6E−3 |
| 7 | −1.5E+2 | −9.5E−2 | 2.1E−2 | −9.0E−3 | 1.3E−3 |

Under such conditions, $d_4/fl=0.186$ was achieved, thereby satisfying the expression (1). $L/fl=1.11$ was achieved, thereby satisfying the expression (2). $f_1/fl=0.763$ was achieved, thereby satisfying the expression (3). $f_1/f_2=0.159$ was achieved, thereby satisfying the expression (4). $f_1/f_3=-0.399$ was achieved, thereby satisfying the expression (5). $d_2/fl=0.155$ was achieved, thereby satisfying the expression (6). $d_3/fl=0.124$ was achieved, thereby satisfying the expression (7).

FIG. 11 shows the astigmatism and the distortion in the imaging lens 1 of the FIFTH EXAMPLE.

According to the result, each of the astigmatism and the distortion was satisfied. It can be seen from the result that a sufficiently excellent optical property can be obtained.

Sixth Example

Figure 12:
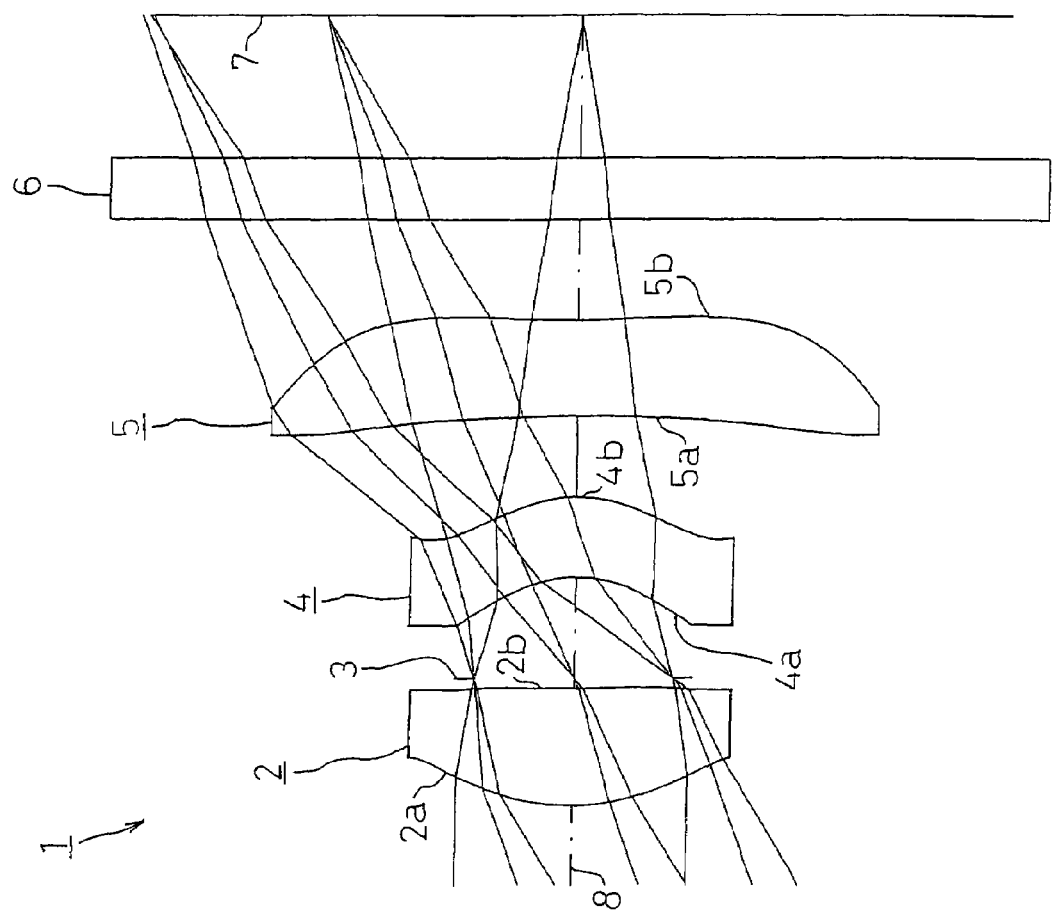
FIG. 12 is a schematic diagram for showing a SIXTH EXAMPLE of the imaging lens according to the present invention.

FIG. 12 shows a SIXTH EXAMPLE of the present invention. The imaging lens 1 of the SIXTH EXAMPLE was set under the following conditions:

Lens Data

F no=2.85, ω=33.35°, L=3.8 mm, fl=3.4 mm, $f_1$=2.586 mm, $f_2$=12.153 mm, $f_3$=−6.163 mm

| Face Number | r | d | nd | vd |
|---|---|---|---|---|
| (Object Point) | | | | |
| 1 (First Face of First Lens) | 0.79 | 0.57 | 1.5310 | 56.0 |
| 2 (Second Face of First Lens) | 0.08 | 0.05 | | |
| 3 (Diaphragm) | 0.00 | 0.49 | | |
| 4 (First Face of Second Lens) | −1.39 | 0.40 | 1.5850 | 30.0 |
| 5 (Second Face of Second Lens) | −1.27 | 0.39 | | |
| 6 (First Face of Third Lens) | −0.09 | 0.47 | 1.5310 | 56.0 |
| 7 (Second Face of Third Lens) | 0.20 | 0.50 | | |
| 8 (First Face of Cover Glass) | 0.00 | 0.30 | 1.5168 | 64.2 |
| 9 (Second Face of Cover Glass) (Image Surface) | 0.00 | | | |

| Face Number | k | A | B | C | D |
|---|---|---|---|---|---|
| 1 | −8.1E−1 | 2.5E−2 | −6.4E−2 | 1.6E−1 | −4.3E−1 |
| 2 | 0 | −9.5E−2 | −1.9E−1 | −3.7E−2 | 0 |
| 4 | −4.5E−2 | 2.2E−1 | 1.3 | −1.3E−1 | 0 |
| 5 | −8.0E−1 | 2.8E−1 | 7.8E−2 | 1.2 | −1.0 |
| 6 | 0 | 3.4E−2 | −6.6E−2 | 3.9E−2 | −6.9E−3 |
| 7 | −1.1E+2 | −9.7E−2 | 2.8E−2 | −1.5E−2 | 2.3E−3 |

Under such conditions, $d_4/fl=0.118$ was achieved, thereby satisfying the expression (1). $L/fl=1.12$ was achieved, thereby satisfying the expression (2). $f_1/fl=0.761$ was achieved, thereby satisfying the expression (3). $f_1/f_2=0.213$ was achieved, thereby satisfying the expression (4). $f_1/f_3=-0.420$ was achieved, thereby satisfying the expression (5). $d_2/fl=0.160$ was achieved, thereby satisfying the expression (6). $d_3/fl=0.118$ was achieved, thereby satisfying the expression (7).

Figure 13:
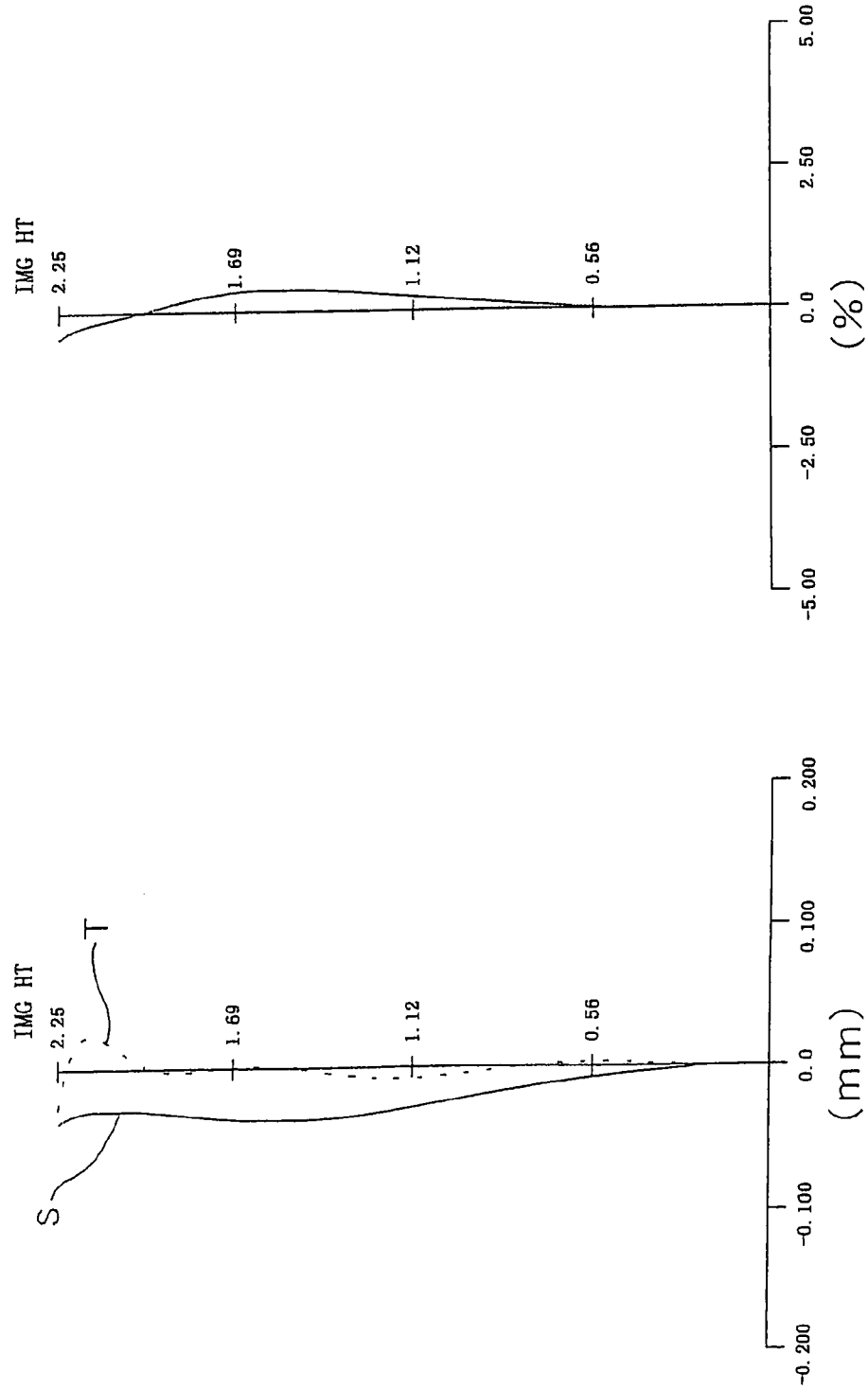
FIG. 13 shows graphs for describing the astigmatism and distortion of the imaging lens shown in FIG. 12.

FIG. 13 shows the astigmatism and the distortion in the imaging lens 1 of the SIXTH EXAMPLE.

According to the result, each of the astigmatism and the distortion was satisfied. It can be seen from the result that a sufficiently excellent optical property can be obtained.

The present invention is not limited to the above-described embodiment. Various modifications can be made as required. For example, a light-transmissive material can be suitably used as the material for the first lens, the second lens, and the third lens.

What is claimed is:

1. An imaging lens used for forming an image of an object on an image-taking surface of an image sensor element, consisting of: in order from an object side to an image surface side, a first lens that is a meniscus lens having a positive power whose convex surface faces the object side, a diaphragm, a second lens that is a meniscus lens having a positive power whose convex surface faces the image surface side, and a third lens that is a biconcave lens having a negative power, wherein a condition expressed by the following expression (1) is to be satisfied:

$$0.11 < d_4/fl \leq 0.25 \qquad (1)$$

where,
- $d_4$: distance between the second lens and the third lens on the optical axis
- fl: focal distance of the entire lens system.

2. The imaging lens according to claim 1, wherein:
a condition expressed by a following expression (2) is to be further satisfied:

$$1 \leq L/fl \leq 1.3 \qquad (2)$$

where,
- L: overall length of lens system (distance from the surface of the first lens on the object side to the image-taking surface [equivalent air length]).

3. The imaging lens according to claim 1, wherein:
a condition expressed by a following expression (3) is to be further satisfied:

$$0.6 \leq f_1/fl \leq 0.9 \qquad (3)$$

where,
- $f_1$: focal distance of the first lens.

4. The imaging lens according to claim 1, wherein:
a condition expressed by a following expression (4) is to be further satisfied:

$$0 < f_1/f_2 \leq 0.8 \qquad (4)$$

where,
- $f_2$: focal distance of the second lens.

5. The imaging lens according to claim 1, wherein:
a condition expressed by a following expression (5) is to be further satisfied:

$$-1 \leq f_1/f_3 \leq -0.1 \qquad (5)$$

where,
- $f_3$: focal distance of the third lens.

6. The imaging lens according to claim 1, wherein:
a condition expressed by a following expression (6) is to be further satisfied:

$$0.12 \leq d_2/fl \leq 0.2 \qquad (6)$$

where,
- $d_2$: distance between the first lens and the second lens on the optical axis.

7. The imaging lens according to claim 1, wherein:
a condition expressed by a following expression (7) is to be further satisfied:

$$0.01 \leq d_3/fl \leq 0.2 \qquad (7)$$

where,
- $d_3$: center thickness of the second lens.

* * * * *